US011985245B2

(12) United States Patent
Bae

(10) Patent No.: US 11,985,245 B2
(45) Date of Patent: May 14, 2024

(54) ACCESS SECURITY SYSTEM USING SECURITY CARD AND MOBILE TERMINAL, AND SECURITY METHOD FOR SAME

(71) Applicant: WHOBORN INC., Seoul (KR)

(72) Inventor: Young Sik Bae, Seoul (KR)

(73) Assignee: WHOBORN INC., Seoul (KR)

( * ) Notice: Subject to any disclaimer, the term of this patent is extended or adjusted under 35 U.S.C. 154(b) by 375 days.

(21) Appl. No.: 17/298,591

(22) PCT Filed: Dec. 5, 2019

(86) PCT No.: PCT/KR2019/017142
§ 371 (c)(1),
(2) Date: May 30, 2021

(87) PCT Pub. No.: WO2020/116975
PCT Pub. Date: Jun. 11, 2020

(65) Prior Publication Data
US 2022/0014376 A1 Jan. 13, 2022

(30) Foreign Application Priority Data
Dec. 5, 2018 (KR) .................. 10-2018-0155392

(51) Int. Cl.
*H04L 9/32* (2006.01)
*G16Y 10/75* (2020.01)
(Continued)

(52) U.S. Cl.
CPC ............ *H04L 9/3234* (2013.01); *G16Y 10/75* (2020.01); *G16Y 30/10* (2020.01); *H04B 5/0031* (2013.01);
(Continued)

(58) Field of Classification Search
CPC ....... H04L 9/3234; H04L 9/0877; H04L 9/30; H04L 9/3242; H04L 9/3247;
(Continued)

(56) References Cited

U.S. PATENT DOCUMENTS

| 7,409,552 B2* | 8/2008 | Buttyan | ............... | G06Q 20/341 380/282 |
| 2003/0041244 A1* | 2/2003 | Buttyan | ............... | G06Q 20/327 713/172 |

(Continued)

*Primary Examiner* — Baotran N To
(74) *Attorney, Agent, or Firm* — Columbia IP Law

(57) ABSTRACT

Disclosed are an access security system using a security card and a mobile terminal, and a security method for same. The present disclosure configures a mutual security function for storing an encrypted public key in a security card (E-card), and storing a private key, which can decrypt the encrypted public key, in a mobile terminal. Accordingly, a security function that is strengthened to the next level is achieved which: only allows secure access at an entrance by means of a mutual certification procedure through an NFC connection between the security card and the mobile terminal; increases the security efficiency of access management while preventing the security of a secure server from being neutralized by an information leak that has occurred due to the loss, theft, hacking, duplication, or the like of the security card; and in particular, fundamentally prevents abnormal connections by third parties to IoT equipment that can be connected to the secure server as a result of the neutralization of security.

9 Claims, 2 Drawing Sheets

(51) Int. Cl.
  *G16Y 30/10* (2020.01)
  *H04B 5/00* (2006.01)
  *H04L 9/08* (2006.01)
  *H04L 9/30* (2006.01)

(52) U.S. Cl.
  CPC .............. *H04L 9/0877* (2013.01); *H04L 9/30* (2013.01); *H04L 9/3242* (2013.01); *H04L 9/3247* (2013.01)

(58) Field of Classification Search
  CPC ............. H04L 2463/062; H04L 9/0825; H04L 9/0861; H04L 9/0894; H04L 63/0442; H04L 63/0853; H04L 2209/805; H04L 67/562; G16Y 10/75; G16Y 30/10; H04B 5/0031; H04W 4/80; H04W 12/009; H04W 12/041; H04W 12/10; H04W 12/47; G07C 9/00309; G07C 2009/00412; G06F 21/34; H04M 1/72403
  See application file for complete search history.

(56) References Cited

U.S. PATENT DOCUMENTS

2011/0225421 A1* 9/2011 Han ........................ H04L 9/321
   713/172
2019/0354729 A1* 11/2019 Krawczewicz ...... H04B 5/0062
2020/0028672 A1* 1/2020 Tang ..................... H04L 9/3297
2022/0103351 A1* 3/2022 Cooper .............. G07C 9/00857

* cited by examiner

ACCESS SECURITY SYSTEM USING SECURITY CARD AND MOBILE TERMINAL, AND SECURITY METHOD FOR SAME

RELATED APPLICATION

This application claims benefit of priority to Korean Patent Application Serial Number 1020180155392, filed on Dec. 5, 2018 and PCT Application PCT/KR2019/017142, filed on Dec. 5, 2019 titled: ACCESS SECURITY SYSTEM USING SECURITY CARD AND MOBILE TERMINAL, AND SECURITY METHOD FOR SAME, which are both incorporated herein by reference in their entirety for all purposes.

INFORMATION

Unless otherwise indicated herein, the approaches described in this section are not prior art to the claims in this application and are not admitted to be prior art by inclusion in this section.

Information protection and access control are urgently required due to the development of electronic technology, but effective access control has not been achieved despite the expansion of important security areas of government agencies, research centers, and companies.

In other words, the current access security technology manages access security by using a barcode type security card, a magnetic (magnetic strip) type security card, or a radio frequency identifier (RFID) type security card or allows access security management by storing an authentication key, image, and biometric information in a mobile terminal such as a smartphone.

However, in the access security technology described above, an authentication key, image information, or biometric information are respectively stored and used in the security card or the mobile terminal, which is an intermediary, and thus when it is subjected to accidents such as theft, loss, hacking, or duplication of the security card or the mobile terminal, the security function has to be disabled if the accidents are not immediately recognized.

In particular, in a situation where the Internet of Things (IoT) technology that controls various things through the Internet is becoming more common due to the development of technology, when the security card or mobile terminal that stores the authentication key, image information, or biometric information is stolen, lost, hacked or duplicated, the control of the Internet of Things cannot be performed normally by an administrator, but is illegally controlled by a third party, thereby inevitably causing great social confusion.

All subject matter discussed in this section of this document is not necessarily prior art and may not be presumed to be prior art simply because it is presented in this section. Plus, any reference to any prior art in this description is not and should not be taken as an acknowledgement or any form of suggestion that such prior art forms parts of the common general knowledge in any art in any country. Along these lines, any recognition of problems in the prior art are discussed in this section or associated with such subject matter should not be treated as prior art, unless expressly stated to be prior art. Rather, the discussion of any subject matter in this section should be treated as part of the approach taken towards the particular problem by the inventor(s). This approach in and of itself may also be inventive. Accordingly, the foregoing summary is illustrative only and not intended to be in any way limiting. In addition to the illustrative aspects, embodiments, and features described above, further aspects, embodiments, and features will become apparent by reference to the drawings and the following detailed description.

SUMMARY

Described herein are various illustrative access security systems and methods. Some example access security systems may include using a security card and a mobile terminal. The example security system may include a mobile terminal that includes a first NFC module and a first storage unit storing a private key for decryption and in which a security application is installed. Additionally, the example security system may include a security card (E-Card) that includes a second NFC module communicable with the first NFC module, a second storage unit storing an encrypted public key of a user ID decrypted by the private key for decryption, and a wired port with which data is capable of being transmitted and received in a wired manner through a docking station. Further, the example security system may include a security server that transmits and receives information to and from the security application of the mobile terminal through the Internet network, generates a public key obtained by encrypting the user ID through user information of the mobile terminal and a private key that decrypts the public key, and transmits a user information image to the mobile terminal when a login of the security card is requested. The mobile terminal may convert the received user information image into an E-Ink format, and the security card may further include an E-Ink display unit that reads the converted user information image for passing through an NFC-based security gate through NFC communication and then displays the converted user information image.

Some example access security methods may include using a security card and a mobile terminal. The method may include registering a security authentication key through a task operation (task1) in a state where the mobile terminal and the security card of a user are connected in NFC passive mode. The method may include after the registration of the security authentication key is completed, requesting a login by making an NFC-based security gate of IoT equipment connected to a security server at a specific entry point recognize the security card. The method may include transmitting, by the security server, an encrypted public key $E_{PkA}(\text{User\_ID})$ stored in the security card to the mobile terminal when making the NFC-based security gate recognize the security card. Additionally, the method may include generating a user ID $D_{SkA}(E_{PkA}(\text{User\_ID}))$, by the mobile terminal, by decrypting the received encrypted public key $E_{PkA}(\text{User\_ID})$ using the stored private key and transmitting the user ID $(D_{SkA}(E_{PkA}(\text{User\_ID})))$ to the security server. Further, the method may include opening, by the security server received the user ID $D_{SkA}(E_{PkA}(\text{User\_ID}))$, the NFC-based security gate through an MQTT broker.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
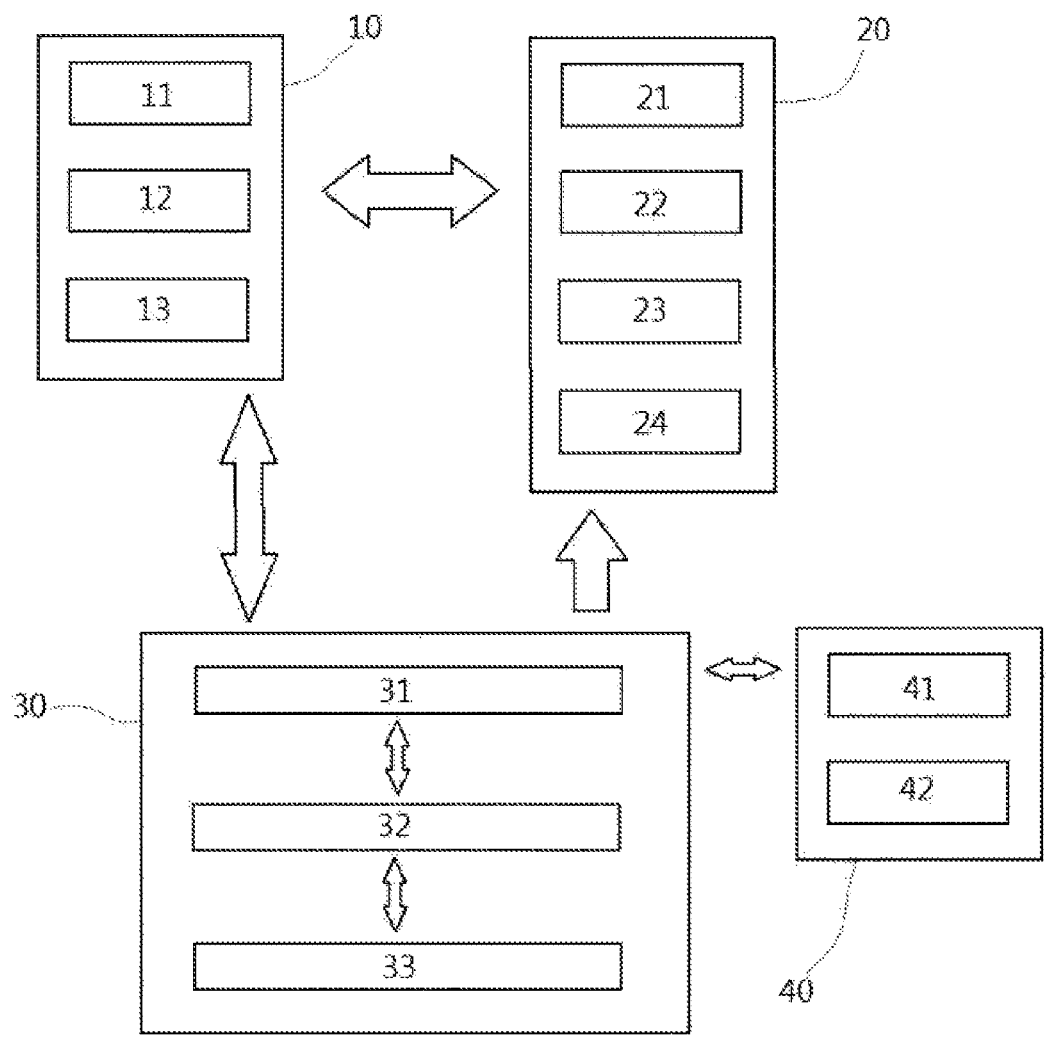
FIG. 1 is a schematic block diagram of an access security system using a security card and a mobile terminal according to an embodiment of the present disclosure.

Advantages and features of the present disclosure, and a method of achieving them will become apparent with reference to the embodiments described below in detail together with the accompanying drawings. However, embodiments included within the technical idea of the present disclosure are not limited to the embodiments disclosed below but may be implemented in various different forms. The embodiments are provided only to make the disclosure of the present disclosure complete, and to fully inform the scope of the disclosure to those of ordinary skill in the art to which the present disclosure belongs and are only defined by the matters falling within the scope of the claims in the technical idea of the present disclosure.

The terms used in the present specification are for describing the embodiments and are not intended to limit the present disclosure. In this specification, the singular form also includes the plural form unless specifically stated in the phrase.

In the present application, it is to be understood that terms such as "include" or "have" are intended to designate the existence of features, numbers, methods, actions, components, parts, or combinations thereof described in the specification and do not preclude the possibility of the presence or addition of one or more other features or numbers, methods, actions, components, parts, or combinations thereof.

In addition, the embodiments described in the present specification will be described with reference to cross-sectional views and/or plan views, which are ideal exemplary diagrams of the present disclosure. Accordingly, the embodiments of the present disclosure are not limited to the specific form illustrated, but also include changes in necessary form. For example, a region illustrated at a right angle may be rounded or may have a shape having a predetermined curvature. Accordingly, the regions illustrated in the drawings have schematic properties, and the shapes of the regions illustrated in the drawings are for illustrating a specific shape of the region of the device and are not intended to limit the scope of the disclosure.

The same reference numerals refer to the same constituent elements throughout the entire specification. Accordingly, the same reference numerals or similar reference numerals may be described with reference to other drawings, even if they are not mentioned or described in the corresponding drawings. Furthermore, even if a reference numeral is not indicated, it may be described with reference to other drawings.

Hereinafter, embodiments of the present disclosure will be described with reference to the accompanying drawings.

This disclosure is drawn, inter alia, to access security technology. An access security system may use a security card and a mobile terminal and may employ a security method for the same. The security method may enable secure access at an entry point through an NFC connection by storing an encrypted public key in a security card (E-Card) and storing a private key capable of decrypting the encrypted public key in a mobile terminal. Various examples disclosed may provide an access security system using a security card and a mobile terminal and a security method for the same that allows secure access at an entry point by being subjected to a mutual certification procedure through an NFC connection between the security card and the mobile terminal by storing an encrypted public key in the security card (E-Card) and storing a private key capable of decrypting the encrypted public key in the mobile terminal, and, through this, can prevent abnormal access security from being released due to theft or loss of the security card, hacking or duplication, etc. of the security card.

In accordance with various embodiments of the present disclosure, there is provided an access security system using a security card and a mobile terminal. The access security system may include a mobile terminal that includes a first NFC module and a first storage unit storing a private key for decryption and in which a security application is installed. The access security system may include a security card (E-Card) that includes a second NFC module communicable with the first NFC module, a second storage unit storing an encrypted public key of a user ID decrypted by the private key for decryption, and a wired port with which data is capable of being transmitted and received in a wired manner through a docking station. Additionally, the access security system may include a security server that transmits and receives information to and from the security application of the mobile terminal through the Internet network, generates a public key obtained by encrypting the user ID through user information of the mobile terminal and a private key that decrypts the public key, and transmits a user information image to the mobile terminal when a login of the security card is requested in which the mobile terminal converts the received user information image into an E-Ink format. The security card further includes an E-Ink display unit that reads the converted user information image for passing through an NFC-based security gate through NFC communication and then displays the converted user information image.

In addition, the user information image is a QR code or a user picture.

In addition, the first NFC module of the mobile terminal and the second NFC module of the security card are connected in a passive communication mode (passive mode) through an NFC tag.

In addition, the security server is configured to connect IoT equipment including a QR reader and an NFC-based security gate, the security server is configured to include the docking station connected to a wired LAN, an operation console, and a message queuing telemetry transport broker (MQTT broker), the MQTT broker is configured to transfer information of pieces of IoT equipment to the operation console, and the docking station is configured to transmit the private key for decrypting the public key generated by the security server to the mobile terminal when storing the encrypted public key of the user ID in the security card issued on the spot.

In accordance with to various embodiments of the present disclosure, there is provided an access security method using a security card and a mobile terminal. The access security method may include registering a security authentication key through a task operation (task1) in a state where the mobile terminal and the security card of a user are connected in NFC passive mode. After the registration of the security authentication key is completed, the access security method may include requesting a login by making an NFC-based security gate of IoT equipment connected to a security server at a specific entry point recognize the security card. The method may include transmitting, by the security server, an encrypted public key $E_{PkA}(User\_ID)$ stored in the security card to the mobile terminal when making the NFC-based security gate recognize the security card. Additionally, the access security method may include generating, a user ID $D_{SkA}(E_{PkA}(User\_ID))$, by the mobile terminal, by decrypting the received encrypted public key $E_{PkA}(User\_ID)$ using the stored private key and transmitting the user ID ($D_{SkA}(E_{PkA}(User\_ID))$) to the security server. Further, the access security method may include opening, by the security server received the user ID $D_{SkA}(E_{PkA}(User\_ID))$, the NFC-based security gate through an MQTT broker.

In addition, the method of registering the security authentication key may include transmitting user information by accessing the security server through the Internet network after activating the security application of the mobile terminal, in a state in which the mobile terminal and the security card are connected in a passive mode. The method may include generating, by the security server, the user ID (ID) based on the user information transmitted from the mobile terminal. The method may include transmitting, after encrypting the user ID is generated with the public key $E_{PkA}(User\_ID)$ and generating a private key SkA for decrypting the encrypted public key $E_{PkA}(User\_ID)$, the private key SkA to the user mobile terminal. Further, the method may include transmitting, by the mobile terminal, the encrypted public key $E_{PkA}(User\_ID)$ to the security card through NFC communication to be stored.

In addition, the method of registering the security authentication key may include performing an electronic signature through a hash to the public key $E_{PkA}(User\_ID)$ stored in the security card after the task operation.

In addition, the method of requesting a login by making an NFC-based security gate of IoT equipment may include docking, when the user receives the security card on the spot by storing the encrypted public key $E_{PkA}(User\_ID)$ at the NFC-based security gate without having the security card, the security card to a docking station when receiving the security card on the spot. Additionally, the method may include transmitting, by the security server, the private key SkA for decrypting the encrypted public key $E_{PkA}(User\_ID)$ stored in the security card to the user mobile terminal to be stored when the security card is docked at the docking station.

In addition, the method of opening, by the security server received the user ID $DSkA(E_{PkA}(User\_ID))$, may include transmitting a previously stored user information image to the mobile terminal when the security server receives the logged-in user ID $D_{SkA}(E_{PkA}(User\_ID))$. Additionally, the method may include passing through the NFC-based security gate by converting, by the mobile terminal, the received user information image to E-Ink format and displaying, by the security card, the user information image while reading the user information image converted to the E-InK format through NFC communication.

As described above, the various embodiments of the present disclosure may have a configuration in which a mutual security function of storing an encrypted public key in a security card (E-Card) and a private key capable of decrypting the encrypted public key in a mobile terminal is implemented. With this configuration, it may be possible to expect an effect of implementing a more reinforced security function by enabling only secure access at the entry point through a mutual authentication procedure through an NFC connection between the security card and the mobile terminal, increasing security efficiency of access management by preventing the security incapacitation of the security server due to information leakage, even if the leakage occurs due to the loss, theft, hacking, or duplication of a security card, and fundamentally blocking abnormal access of a third party to IoT equipment capable of being connected to the security server due to the security incapacitation.

The effects of the present disclosure are not limited to the above-mentioned effects, and other effects not mentioned will be clearly understood by those skilled in the art from the descriptions of the claims.

FIG. 1 illustrates a schematic block diagram of an access security system using a security card and a mobile terminal according to an embodiment of the present disclosure.

Referring to FIG. 1, the access security system using the security card and the mobile terminal according to an embodiment of the present disclosure connects a mobile terminal 10 with a security card 20 and a security server 30, while IoT equipment 40 may be connected to the security server 30.

The mobile terminal 10 may be a general smartphone capable of communication, but any portable terminal having a communication function can be used.

That is, the mobile terminal 10 includes all devices capable of an Internet communication, an internal storage, an NFC read/write function through an NFC module, and application execution through an OS, and in which a first NFC module 11 including all NFC modules having a functional condition capable of reading and writing the content of the NFC card through NFC read/write may be included, and a first storage unit 12, as a basic internal storage stored in the initial factory design in the mobile terminal 1, for storing a private key (SkA) for decryption, and a security application 13 that exchanges data from the security server 30 and performs a task necessary for security may also be installed.

Here, the private key SkA may be stored by being received from the security server 30, and accordingly, the mobile terminal 10 can transmit and receive various types of security-related information to and from the security server 30 through a wireless Internet network.

In addition, the mobile terminal 10 is installed with a format program that converts a user information image transmitted from the security server 30 into an E-Ink format when the user information image is received.

The security card (E-Card) 20 is a card which includes an NFC module having a storage and connectable in a passive mode, and receives power and data in a wired manner as needed and has an electronic ink display, and the security card (E-Card) 20 is a card type of a method of receiving or transmitting data by receiving power wirelessly by being connected in the passive mode and includes a second NFC module 21 communicable with the first NFC module 11, a second storage unit 22, as an NFC storage unit, which is connected to the second NFC module 21 and an E-ink display unit 23 to receive and output an output format of the E-Ink display unit 23 or in which an encrypted public key $E_{PkA}(User\_ID)$ which is decrypted by the private key SkA for decryption is stored, and a wired port 24 through which data can be transmitted and received in a wired manner through the docking station 31.

That is, the encrypted public key $E_{PkA}(User\_ID)$ of the user ID stored in the second storage unit 22 of the security card 20 can be stored by being from the security server 30 through the mobile terminal 10.

Accordingly, the mobile terminal 10 and the security card 20 are selectively maintained in a connected state as necessary in the passive communication mode (passive mode) of the NFC tag through the first and second NFC modules 11 and 21.

In this case, the security card 20 includes the E-Ink display unit 23, and the E-ink display unit 23 is the electronic ink display that receives and outputs data in an E-link output format and is configured to be able to read the user information image when the mobile terminal 10 changes the user information image received from the security server 30 to the E-Ink format through the format program and to display the user information image read in this way for passing through the NFC-based security gate.

That is, the user image information displayed on the E-Ink display unit 23 of the security card 20 serves as an identification card for passing through the gate.

The security server 30 can transmit and receive information through a wireless Internet network to and from the security application 13 of the mobile terminal 10, and generate a public key $E_{PkA}(User\_ID)$ encrypted through user information (e.g., user name, photo, etc.) of the mobile terminal 10 and private key SkA information for decrypting the public key $E_{PkA}(User\_ID)$, and is configured to authenticate the public key $E_{PkA}(User\_ID)$ decrypted by the private key SkA when a login of the security card 20 is requested, and transmit the user information image to the mobile terminal 10.

In this case, the security server 30 can be connected to the IoT equipment 40 including the QR reader 41 and the NFC-based security gate 42, and the security server 30 is configured to include a docking station 31 connected to a wired LAN, an operation console 32, and a message queuing telemetry transport broker (MQTT broker) 33 and has a configuration in which the MQTT broker 33 sends the information of pieces of IoT equipment 40 to the operation console 32, and the docking station 31 transmits the private key SkA for decrypting the public key $E_{PkA}(User\_ID)$ generated by the security server 30 to the mobile terminal 20 when storing the encrypted public key $E_{PkA}(User\_ID)$ in the security card 20 issued on the spot.

Here, after the public key $E_{PkA}(User\_ID)$ generated by the security server 30 is stored in the security card 20 through the security application 13, the public key $E_{PkA}(User\_ID)$ and the user information image can be stored in the security card 20 through the wired port 24 of the security card 20 on the spot using the docking station 31.

Figure 2:
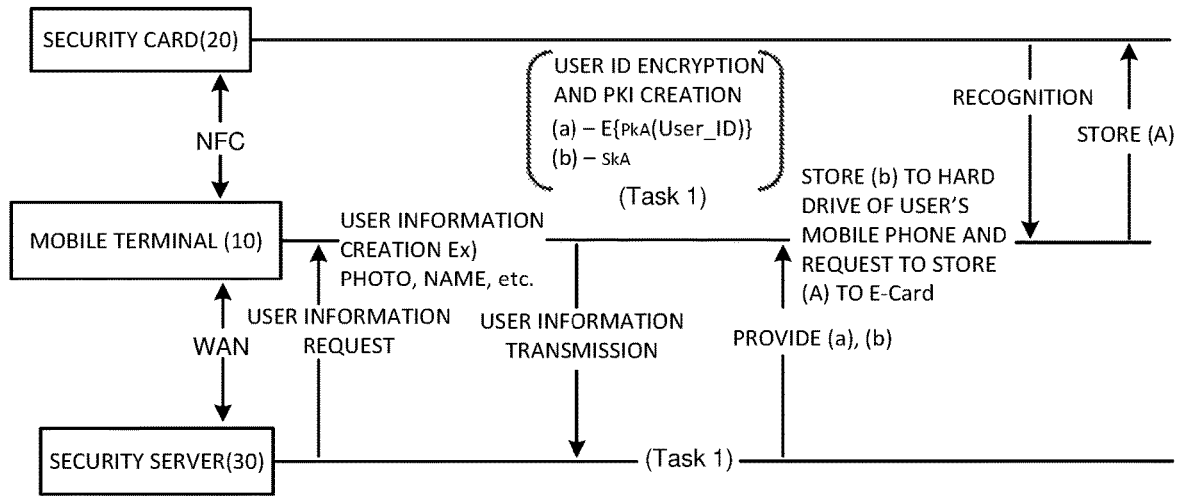
FIG. 2 is a flowchart of a state in which a security authentication key (public key/private key) is registered and stored respectively in the security card and the mobile terminal according to an embodiment of the present disclosure.
Figure 3:
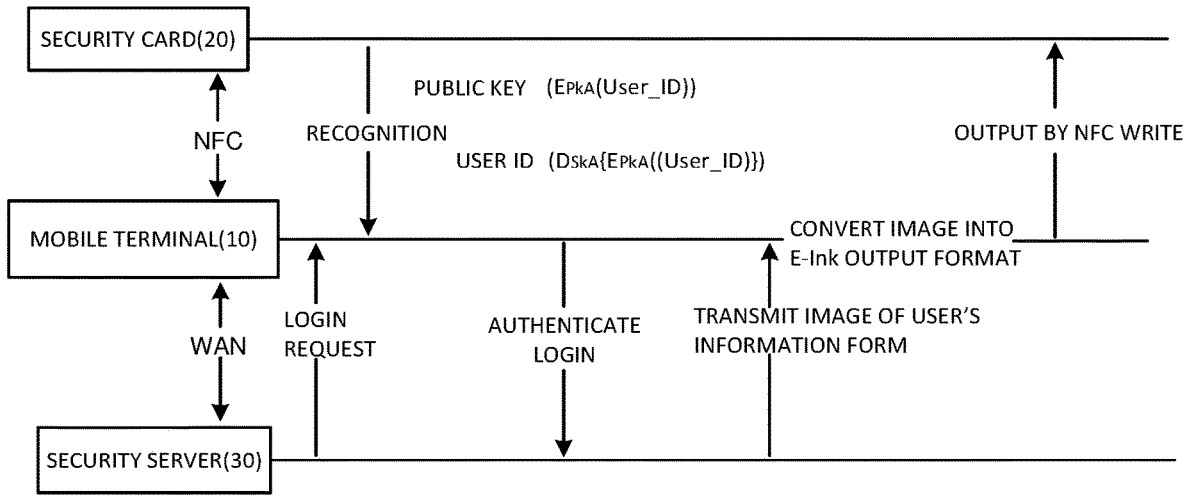
FIG. 3 is a flowchart of a state in which access security is performed using the security authentication key (public key/private key) stored respectively in the security card and the mobile terminal according to an embodiment of the present disclosure.

As described above, the security technology according to an embodiment of the present disclosure, as in the accompanying FIGS. 1 to 3, is, first, in a state in which the mobile terminal 10 of the user and the security card 20 are connected in an NFC passive mode using the first and second NFC modules 11 and 21, the mobile terminal 10 connects to the security server 30 through a wireless Internet network.

Then, the security server 30 may perform registration of a security authentication key through a task operation (task1).

If the registration will be described in more detail with reference to the accompanying FIG. 2, first, in a state in which the mobile terminal 10 and the security card 20 are connected in an NFC passive mode, the mobile terminal 10 accesses the security server 30 through a wireless Internet network after activating the security application 13 of the mobile terminal 10, and then transmits user information (e.g., user name, picture, etc.) to the security server 30.

Then, the security server 30 generates a public key $E_{PkA}(User\_ID)$ obtained by encrypting the user ID after generating a user ID (ID) between approximately 64 bits and 128 bits based on the user information (e.g., user name, photo, etc.) transmitted from the mobile terminal 20, and generates a private key SkA for decrypting the encrypted public key $E_{PkA}(User\_ID)$ and then transmits the public key $E_{PkA}(User\_ID)$ and private key SkA to the mobile terminal 10.

In this case, the mobile terminal 10 stores the private key SkA in the first storage unit 12, which is an NFC storage and transmits the public key $E_{PkA}(User\_ID)$ obtained by encrypting the user ID to the security card 20 through NFC communication, and the public key $E_{PkA}(User\_ID)$ is stored in the second storage unit 22 as an NFC storage unit of the security card 20.

Here, for the encrypted public key $E_{PkA}(User\_ID)$ stored in the security card 20 after the task operation performed in the security server 30, an electronic signature may be further performed through a hash, if necessary.

Meanwhile, after the registration of the security authentication key described above is completed, when requesting a login by making the NFC-based security gate 42 of the IoT equipment 40 connected to the security server 30 of a specific entry point recognize the security card 20, the security server 30 requests the mobile terminal 10, through the security application 13, to authenticate the encrypted public key $E_{PkA}(User\_ID)$ by transmitting the encrypted public key $E_{PkA}(User\_ID)$ stored in the security card 20 to the mobile terminal 10.

Then, the mobile terminal 10 decrypts the received encrypted public key $E_{PkA}(User\_ID)$ using the stored private key SkA and generates a user ID $D_{SkA}(E_{PkA}(User\_ID))$ and then transmits the user ID from the security server 30, and thus the security card 20 can be logged in to the security server 30.

Here, when a user is intended to pass through the NFC-based security gate 42, but do not have a security card and thus receives the security card 20 storing the encrypted public key $E_{PkA}(User\_ID)$ at the NFC-based security gate 42 on the spot, the security card 20 is docked to the docking station 31.

Then, when the security card 20 is docked to the docking station 31, the security server 30, the security server 30 can transmit the private key SkA for decrypting the encrypted public key $E_{PkA}(User\_ID)$ stored in the security card 20 to the user mobile terminal 10.

In this case, when receiving the logged-in user ID $D_{SkA}(E_{PkA}(User\_ID))$, the security server 30 transmits the previously stored user information image to the mobile terminal 10, and the mobile terminal 10 converts the received user information image into the E-Ink format.

Then, the security card 20 reads the user information image converted to the E-InK format through NFC communication and displays the user information image through the E-Ink display unit 23, so that the user can pass through the NFC-based security gate 42 included in the IoT equipment 40 while causing the identity to be checked through image information displayed on the E-InK display unit 23 of the security card 20.

That is, the user causes the identity to be checked through image information such as a QR code displayed on the E-Ink display unit 23 of the security card 20 and can pass through the NFC-based security gate 42 included in the IoT equipment 40.

In the above, although the technical idea of the access security system using the security card and the mobile terminal of the present disclosure has been described with the accompanying drawings, this is illustrative of the best embodiment of the present disclosure but does not limit the present disclosure.

Accordingly, the present disclosure is not limited to the specific preferred embodiments described above, and anyone having ordinary skill in the technical field to which the present disclosure pertains can implement various modifications without departing from the gist of the present disclosure claimed in the claims, as well as such alterations made thereto are within the scope set forth in the claims.

What is claimed:

1. An access security system using a security card and a mobile terminal, comprising:
   the mobile terminal that includes a first Near Field Communication (NFC) module and a first storage unit storing a private key for decryption and in which a security application is installed;
   the security card (E-Card) that includes a second NFC module communicable with the first NFC module, a second storage unit storing an encrypted public key of a user ID decrypted by the private key for decryption, and a wired port with which data is capable of being transmitted and received in a wired manner through a docking station; and
   a security server that transmits and receives information to and from the security application of the mobile terminal through an Internet network, generates a public key obtained by encrypting the user ID through user information of the mobile terminal and a private key that decrypts the public key, and transmits a user information image to the mobile terminal when a login of the security card is requested,
   wherein the mobile terminal converts the received user information image into an E-Ink format, and the security card further includes an E-Ink display unit that reads the converted user information image for passing through an NFC-based security gate through NFC communication and then displays the converted user information image.

2. The access security system of claim 1, wherein the user information image is a quick response (QR) code or a user picture.

3. The access security system of claim 2, wherein the first NFC module of the mobile terminal and the second NFC module of the security card are connected in a passive communication mode (passive mode) through an NFC tag.

4. The access security system of claim 3, wherein the security server is configured to connect Internet of Things (IoT) equipment including a QR reader and an NFC-based security gate, the security server is configured to include the docking station connected to a wired LAN, an operation console, and a message queuing telemetry transport broker (MQTT broker), the MQTT broker is configured to transfer information of pieces of IoT equipment to the operation console, and the docking station is configured to transmit the private key for decrypting the public key generated by the security server to the mobile terminal when storing the encrypted public key of the user ID in the security card issued on the spot.

5. An access security method using a security card and a mobile terminal, comprising:
   registering a security authentication key through a task operation (task1) in a state where the mobile terminal and the security card of a user are connected in Near Field Communication (NFC) passive mode;
   after the registration of the security authentication key, requesting a login by making an NFC-based security gate of Internet of Things (IoT) equipment connected to a security server at a specific entry point recognize the security card;
   transmitting, by the security server, an encrypted public key $E_{PkA}$(User_ID) stored in the security card to the mobile terminal when making the NFC-based security gate recognize the security card;
   generating a user ID $D_{SkA}(E_{PkA}$(User_ID)), by the mobile terminal, by decrypting the received encrypted public key $E_{PkA}$(User_ID) using a stored private key and transmitting the user ID ($D_{SkA}(E_{PkA}$(User_ID))) to the security server; and
   opening, by the security server received the user ID $D_{SkA}(E_{PkA}$(User_ID)), the NFC-based security gate through a message queuing telemetry transport (MQTT) broker.

6. The access security method of claim 5, wherein registering the security authentication key comprises:
   transmitting user information by accessing the security server through an Internet network after activating a security application of the mobile terminal, in a state in which the mobile terminal and the security card are connected in a passive mode;
   generating, by the security server, the user ID (ID) based on the user information transmitted from the mobile terminal;
   transmitting, after encrypting the user ID generated with the public key $(_{PkA}$(User_ID) and generating a private key SkA for decrypting the encrypted public key $E_{PkA}$(User_ID), the private key SkA to the user mobile terminal; and
   transmitting, by the mobile terminal, the encrypted public key $E_{PkA}$(User_ID) to the security card through NFC communication to be stored.

7. The access security method of claim 6, wherein registering the security authentication key further comprises performing an electronic signature through a hash to the public key $E_{PkA}$(User_ID) stored in the security card after the task operation.

8. The access security method of claim 5, wherein requesting a login by making an NFC-based security gate of IoT equipment comprises:
   docking, when the user receives the security card on the spot by storing the encrypted public key $E_{PkA}$(User_ID) at the NFC-based security gate without having the security card, the security card to a docking station when receiving the security card on the spot; and
   transmitting, by the security server, the private key SkA for decrypting the encrypted public key $E_{PkA}$(User_ID) stored in the security card to the user mobile terminal to be stored when the security card is docked at the docking station.

9. The access security method of claim 5, wherein opening the NFC-based security gate through the MQTT broker comprises:

transmitting a previously stored user information image to the mobile terminal when the security server receives the logged-in user ID $D_{SkA}(E_{PkA}(\text{User\_ID}))$; and passing through the NFC-based security gate by converting, by the mobile terminal, the received user information image to E-Ink format and displaying, by the security card, the user information image while reading the user information image converted to the E-InK format through NFC communication.

\* \* \* \* \*